United States Patent
Amon et al.

(10) Patent No.: US 8,472,739 B2
(45) Date of Patent: Jun. 25, 2013

(54) METHOD FOR ENCODING A SEQUENCE OF DIGITIZED IMAGES

(75) Inventors: Peter Amon, München (DE); Jürgen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 12/737,814

(22) PCT Filed: Aug. 14, 2009

(86) PCT No.: PCT/EP2009/060570
§ 371 (c)(1),
(2), (4) Date: Feb. 18, 2011

(87) PCT Pub. No.: WO2010/020592
PCT Pub. Date: Feb. 25, 2010

(65) Prior Publication Data
US 2011/0170789 A1    Jul. 14, 2011

(30) Foreign Application Priority Data
Aug. 19, 2008  (DE) .......................... 10 2008 038 355
Nov. 21, 2008  (DE) .......................... 10 2008 058 489

(51) Int. Cl.
*G06K 9/36* (2006.01)
*G06K 9/46* (2006.01)

(52) U.S. Cl.
USPC ............................. 382/238; 382/232; 382/233

(58) Field of Classification Search
USPC ................................................ 382/232–253
See application file for complete search history.

(56) References Cited

U.S. PATENT DOCUMENTS

| | | | |
|---|---|---|---|
| 4,776,029 A | 10/1988 | Shimura | |
| 4,809,350 A | 2/1989 | Shimoni et al. | |
| 5,311,305 A | 5/1994 | Mahadevan et al. | |
| 5,490,221 A * | 2/1996 | Ransford et al. | 382/130 |
| 2005/0111746 A1* | 5/2005 | Kumar et al. | 382/248 |
| 2006/0050972 A1 | 3/2006 | Reznic et al. | |
| 2007/0248271 A1* | 10/2007 | Sakai et al. | 382/236 |

FOREIGN PATENT DOCUMENTS
EP    1 850 599 A2    10/2007

OTHER PUBLICATIONS

Tabatabai, et al.; "Motion Estimation Methods for Video Compression—A Review" J. Franklin Inst. vol. 335B; No. 8; 1998; pp. 1411-1441.

(Continued)

*Primary Examiner* — Li Liu
(74) *Attorney, Agent, or Firm* — Staas & Halsey LLP

(57) ABSTRACT

Pixels with associated pixel values form a sequence of digitized images that are encoded by predicting pixels of the images and encoding the prediction errors. At least a part of the pixels are encoded by determining trajectories, each running through a pixel to be encoded and through other previously encoded pixels from the image of the pixel being encoded and/or from one or more images that are temporally proximate to that image. For each of the trajectories determined, a valuation parameter is in inverse proportion to the deviations in the uncoded associated pixel values of the other pixels along a trajectory. A predicted pixel value of the pixel to be encoded is determined based on the other pixels of the trajectory with the highest valuation.

23 Claims, 2 Drawing Sheets

OTHER PUBLICATIONS

Weinberger et al.; "The LOCO-I Lossless Image Compression Algorithm Principles and Standardization into JPEG-LS", IEEE Transactions on Image Processing, vol. 9, No. 8, Aug. 2000, pp. 1309-1324.

International Search Report for PCT/EP2009/060570; mailed Nov. 18, 2009.

M. Weinberger et al; "The LOCO-I Lossless Image Compression Algorithm: Principles and Standardization into JPEG-LS"; Hewlett-Parckard Laboratories Technical Report No. HPL-98-193R1, Nov. 1998, revised Oct. 1999, pp. 1-33.

* cited by examiner

METHOD FOR ENCODING A SEQUENCE OF DIGITIZED IMAGES

CROSS REFERENCE TO RELATED APPLICATIONS

This application is the U.S. national stage of International Application No. PCT/EP2009/060570, filed Aug. 14, 2009 and claims the benefit thereof. The International Application claims the benefits of German Application No. 102008038355.4 filed Aug. 19, 2008 and German Application No. 102008058489.4 Nov. 21, 2008; all applications are incorporated by reference herein in their entirety.

BACKGROUND

Described below is a method for encoding a sequence of digitized images formed by a plurality of pixels having associated pixel values, as well as to a corresponding decoding method and a corresponding encoder and decoder.

In a plurality of technical application fields it is desirable to compress digitized images as well as possible with low losses in order to keep the storage space required for the images small. In addition it is often necessary to retrieve large volumes of data from digitized images as quickly as possible from a memory over a transmission network, even with a restricted bandwidth, in which case minor losses during the compression of the image data can also be accepted if necessary.

Digitized image sequences occur in areas such as medical applications, in which for example with X-ray imaging by a computed tomograph a sequence of two-dimensional slice images of organs of the patient being X-rayed are generated, with the slice images being acquired at a certain spatial distance from each other. Various compression methods for lossless compression of such image data are known from the related art, with this method also being employed for any other digitized images. In particular the standards JPEG-LS or JPEG-2000 are used for compression in which the individual images of the image sequence are compressed independently of each other. In such methods an existing correlation between the individual consecutive images is not exploited.

Various video encoding standards are also known in the related art which are used for compression of moving image content, especially of video films. In the H.264/AVC encoding standard, image blocks of consecutive images are predicted with the aid of movement compensation. The prediction error produced is then encoded.

SUMMARY

An aspect is to create a method or a device for encoding or decoding of images which makes possible good compression rates for images of any given image content.

In the method a sequence of digitized images have a plurality of pixels with assigned pixel values is encoded, with pixels of images to be encoded being predicted and the prediction error produced by the prediction being encoded. A pixel to be encoded is predicted in such cases for at least some of the pixels with the aid of trajectories along encoded pixels. The trajectory-based prediction may be always carried out in such cases when it is possible, i.e. when a sufficient number of already encoded pixels exists.

In the prediction of a pixel to be encoded based on trajectories, first of all a plurality of trajectories is determined, with the trajectories each running through the pixel to be encoded and further pixels from the image of the pixel to be encoded and/or from one or more images that are temporally proximate to the image of the pixel to be encoded. For the determined trajectories at least one valuation parameter is determined that is configured in such a way that the smaller the deviations in the uncoded pixel values of the other pixels along the trajectory, the higher is the trajectory evaluated according to the valuation parameter. Based on the other pixels of the trajectory with the highest valuation or the highest valuation parameter, a prediction value for the pixel value of the pixel to be encoded is then determined.

The method is based on the knowledge that pixels with similar pixel values often continue in a prespecified direction so that especially good prediction is achieved with the aid of trajectories of which the pixels have similar pixel values. This enables a high level of encoding efficiency, especially for a lossless or almost lossless encoding to be achieved.

In an embodiment, the valuation parameter in such cases depends on the sum of the amount of deviations or the quadratic deviations between the image pixel values of the further pixels of the trajectory and the average of these pixel values, with a trajectory being evaluated higher, the smaller the amounts of deviation or quadratic deviations are.

If necessary the valuation parameter also depends on the distances between the other pixels of the trajectory, with a trajectory being given a higher evaluation, the greater these distances are. A suitable normalization of the valuation parameter is achieved in this way. Likewise the valuation parameter can depend on the distance between the pixel to be encoded and the other pixel lying closest to the pixel to be encoded, with a trajectory being given a higher evaluation, the smaller this distance is. This means that the valuation of trajectory includes a reliability factor, in which case it is assumed that the information that a pixel to be encoded belongs to a structure with similar pixel values, is all the more reliable, the closer the other pixels of the trajectory are to the pixel to be encoded.

Trajectories with the same length and/or even trajectories with different lengths can be taken into consideration in the prediction. The decisive factor is merely that a trajectory includes at least two other already encoded pixels.

In a further embodiment the permitted length of the trajectories used for prediction is increased by one pixel after each encoding of the image. This takes account of the fact that longer trajectories can be formed from pixels of different images the more images have already been encoded. If necessary the permitted length of the trajectories can also be selected at least as a fixed value for a prespecified number of consecutive images.

In an embodiment the prediction value for the pixel value of the pixel to be encoded is determined by extrapolation. In such cases any given extrapolation methods can be employed, especially a linear extrapolation and/or a spline extrapolation and/or a polynomial extrapolation. If necessary it is also possible for the average value of the pixel values of the other pixels to be determined as the prediction value for the pixel value of the pixel to be encoded.

In an embodiment of the method, for at least some the images, pixels are predicted by trajectories formed of pixels from the same image and/or by trajectories formed of pixels from different images. In particular during the initialization of the method, at least for the first two images, pixels are predicted by trajectories from the same image and/or based on an encoding differing from the method. The different coding is used in an image if there are not yet sufficiently many pixels available for prediction based on trajectories.

In an embodiment, the prediction error produced from the prediction is represented at least partly by the deviation between the pixel value of the pixel to be encoded and the predicted pixel value. The difference in such cases is especially affected by its leading sign in order during a later decoding to also correct the decoded pixel correctly by the deviation.

If necessary an information loss in the encoded images can be accepted in the method for increasing encoding efficiency. In such cases a threshold value may be prespecified, with the prediction error produced by the prediction if the threshold value is exceeded by a certain amount being represented by the deviation between the image pixel value of the pixel to be encoded and the predicted pixel value and otherwise set to the value zero. In this way an error limit is taken into account, with all prediction errors less than or equal to the error limit being set to zero, which improves the encoding efficiency. In such cases, the image value of a pixel with a prediction error of zero may be replaced by the predicted pixel value in order to avoid a drift between the encoding and the decoding of the images in this way.

The actual prediction error can be encoded in the method in both a lossless and also lossy manner. In this case known methods for encoding the prediction error from the related art are used, which especially include a transformation (e.g., a DCT transformation) and a quantization and/or an entropy encoding. A quantization implies information losses in such cases, whereas the entropy coding is lossless.

In the case of lossy encoding of a prediction error, the pixel value of the pixel for which the prediction error has been determined may be replaced by the pixel value predicted and corrected with the decoded prediction error. In this way it is again ensured that no drifts occur between the encoding and the decoding of the images.

Normally it is not necessary in the method for side information relating to the execution of the encoding to be transmitted, since the decoding procedure is similar to that of the encoding and no information is needed from the encoder carrying out the encoding. Should a number of different prediction modes be used, side information can be generated however if necessary for signaling the prediction mode used for the encoded images.

An area of application of the method is the encoding of digitized images in the form of medical images, especially of medical X-ray images. Above all with such images structures with the same or similar pixel values continue in those directions in which the imaged object (e.g. the organ of the patient) lies, or which represent a boundary between the organ and its surroundings.

As well as the encoding method described above, also described is a method for decoding a sequence of digitized images which are encoded with the coding method described below. In this case the prediction errors of the respective pixels are decoded and the respective pixels to be decoded are predicted, with a decoded pixel being produced from a correction of a predicted pixel with the decoded prediction error. The prediction of a pixel to be decoded is again carried out on the basis of trajectories. In particular a plurality of trajectories are determined, with the trajectories respectively running through the pixel to be decoded and other already decoded pixels from the image of the pixel to be decoded and/or from one or more images temporally adjacent to the image of the pixel to be decoded. For the determined trajectories a respective parameter value is determined which is configured such that a trajectory is given a higher value in accordance with the valuation parameter, the smaller are the deviations of the decoded pixel values of the other pixels along the trajectory.

Based on the further pixels of the trajectory with the highest valuation or the highest valuation parameter, a prediction value for the pixel value of the pixel to be decoded is then determined.

As well as the encoding and decoding methods described above, also described is a method for transmitting a sequence of digitized images, in which the images of the sequence are encoded with the method described below, are transmitted over a transmission link and are subsequently decoded with the decoding method described below.

The encoder may encode a sequence of digitized images by prediction of pixels of the images to be encoded as well as encoding the prediction errors resulting from the prediction.

Also described below is a corresponding decoder for decoding a sequence of images encoded by the method, with the decoder decoding the prediction errors of the respective pixels as well as a prediction of the pixels to be decoded, with a decoded pixel resulting from a correction of a predicted pixel with the decoded prediction error. The prediction is carried out based on trajectories by the decoding method.

Also described below is a system, including an encoder and a decoder.

BRIEF DESCRIPTION OF THE DRAWINGS

These and other aspects and advantages will become more apparent and more readily appreciated from the following description of the exemplary embodiments with reference to the accompanying drawings of which.

DETAILED DESCRIPTION OF THE PREFERRED EMBODIMENT

Figure 1:
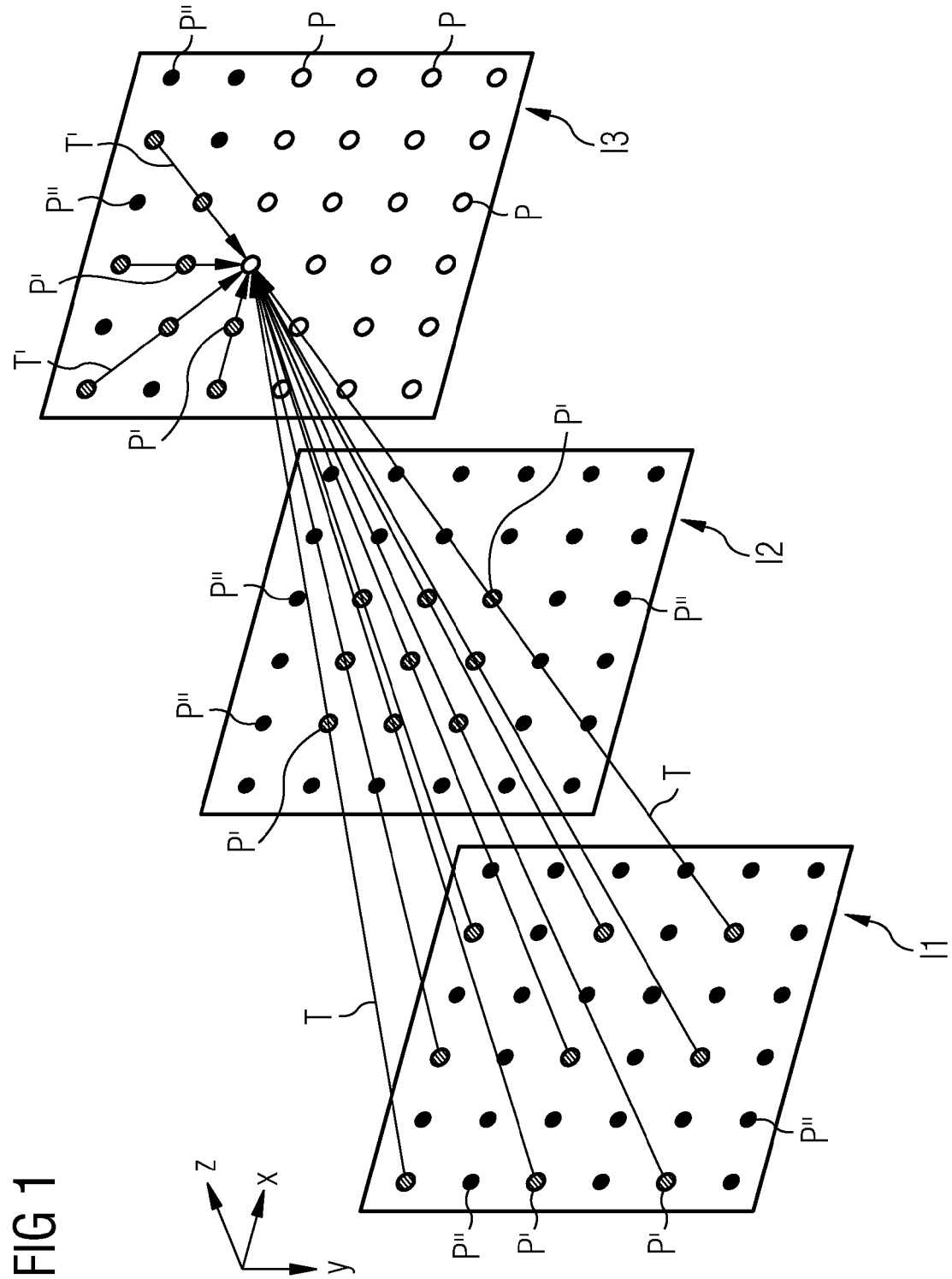
FIG. 1 a schematic diagram of the encoding of images in accordance with a form of embodiment of the method.

Reference will now be made in detail to the preferred embodiments, examples of which are illustrated in the accompanying drawings, wherein like reference numerals refer to like elements throughout.

The principle of the encoding is described below with reference to FIG. 1, based on an extract of a sequence of digitized images including three images I1, I2 and I3 following on consecutively from one another. The sequence of images can typically involve images acquired by imaging medical systems. The individual images can especially represent slice images of organs of a patient acquired with a computed tomograph. Very large amounts of data are generated by such systems which must be stored for archiving in a lossless or practically lossless form.

Each individual image I1, I2 or I3 of the digitized image sequence in accordance with FIG. 1 contains a plurality of image points in the form of pixels, with each pixel being assigned a pixel value which for black-and-white images is a brightness value and for color images is generally a luminance value. The individual pixels of the images are represented in FIG. 1 by points, with the distinction being made between three different types of pixels. Pixels P to be encoded are reproduced by white pixels, pixels already encoded by black and crosshatched pixels P', P'''. In such cases the crosshatched pixels P' serve in FIG. 1 to form trajectories for prediction of the pixel to be encoded in the third row and the third column of image I3. For reasons of clarity only a few of the pixels are labeled in FIG. 1 with the corresponding reference characters P, P' and P''. Also shown in FIG. 1 is a coordinate system with an x, y and z direction. The x-y plane in this figure represents the two-dimensional extent of the corresponding images and the temporal sequence of the images is reproduced by the z direction, with image I1 having been acquired before image I2 and image I2 before image I3.

The example of FIG. 1 shows the encoding of the pixel in the third column and third row of image I3. In the encoding method, trajectories are determined starting from the pixel to be encoded through at least two further, already encoded pixels in the same image I3 or in the adjacent images I1 and I2. The trajectories which run through pixels in the same image I3 are labeled in this case in FIG. 1 with T'. By contrast the trajectories which run through the temporally preceding images I1 and I2, are labeled with the reference character T. Once again for reasons of clarity only a few trajectories are provided with the corresponding reference characters T or T'. Based on the trajectories, a suitable prediction of the pixels to be encoded is made possible with the encoding method described herein. The individual operations for prediction proceed as described below in such cases.

Initially a number n of pixels is defined which will be selected per trajectory. The number corresponds in this case to the total number of the pixels per trajectory, minus the pixel to be encoded. In this case at least two pixels must be present as a minimum number. In the scenario of FIG. 1 this number has been set to n=2. It is however also possible for the value n of the number of pixels to vary within the course of the method or to be selected differently for trajectories with pixels within the same image than for trajectories with pixels from different images. If necessary, after each encoding of a new image, the number of permissible pixels per trajectory can always be incremented by one.

After defining the number of pixels the trajectories running through already encoded pixels are determined. In the scenario of FIG. 1 in this case trajectories are included both in image I3 and also in the two previous images I1 and I2. If necessary it is also possible for only trajectories from the same image or only trajectories with pixels from different images to be used in the method. In accordance with FIG. 1 four trajectories T' with pixels from the same image I3 and nine trajectories T each with a pixel from image I1 and image I2 exist. A measure of error $f_1$ is now determined for each of the trajectories, which represents the deviation of the pixel values of the pixels P' of the respective trajectory from the average of these pixel values. This means that the measure of error is defined as follows in the form of embodiment described here:

$$f_1 = \sum_{i=1}^{n} |w_i - \bar{w}| \text{ with } \bar{w} = \frac{1}{n}\sum_{i=1}^{n} w_i$$

The above measure of error corresponds to a specific variant of a valuation parameter with a lower measure of error corresponding to a higher valuation.

The measure of error can also if necessary be defined in another way, the only decisive factor is that the measure of error represents a measure for the fluctuations of the image values along the trajectory. For example, instead of the deviation in the form of the amount of difference between pixel value and average value, the quadratic deviation and thereby the variance can be used for computing the measure of error.

With the aid of the above measure of error, the measure of error for the scenario of FIG. 2 in which n=2 is selected, is produced as follows:

$$f_1 = |w_1 - w_2|$$

The measure of error can if necessary also be defined so that it is standardized by the distance d of the pixels on the trajectory. A corresponding measure of error $f_2$ is then as follows:

$$f_2 = \frac{1}{d}\sum_{i=1}^{n} |w_i - \bar{w}| \text{ with } d = \sqrt{(\Delta x)^2 + (\Delta y)^2 + (\Delta z)^2}$$

$\Delta x$, $\Delta y$ and $\Delta z$ in this case are the distances between two pixels on the trajectory in the x or y or z direction. In the scenario of FIG. 1 these distances are constant along a trajectory. If necessary the above equation can also be modified such that varying distances between the individual pixels are taken into account.

Based on the measure of error, the trajectory with the smallest measure of error, i.e. with the highest valuation, is finally selected. In this case account is taken of the fact that, especially in medical images, structures with an equal or similar brightness value continue in one direction. The predictor or prediction value $\hat{w}$ for the pixel to be encoded is then determined in the form of embodiment described here based on extrapolation along the selected trajectory. For the case considered in FIG. 1, in which n=2, a linear extrapolation is typically used in which the predictor $\hat{w}$ is produced as follows:

$$\hat{w} = w_2 - \Delta w = w_2 - (w_1 - w_2) = 2w_2 - w_1$$

Figure 2:
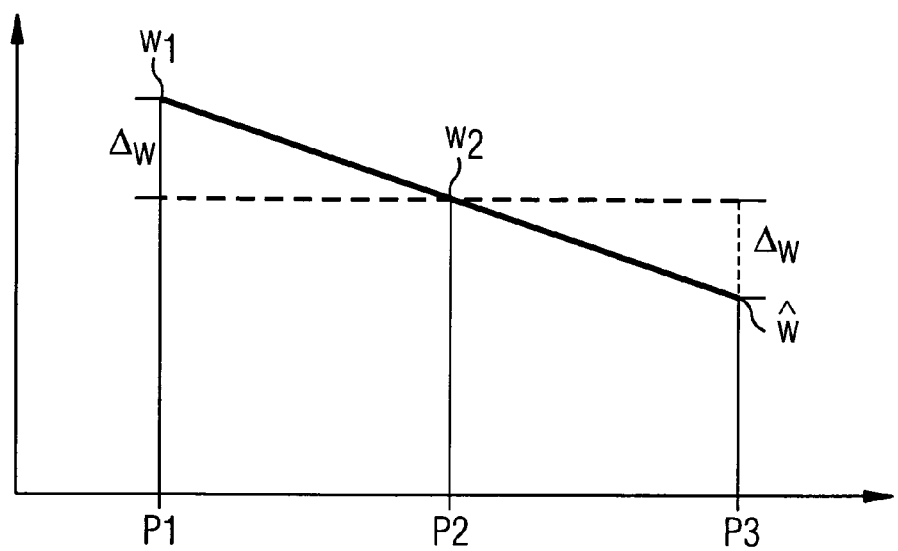
FIG. 2 a diagram which illustrates the computation of a prediction value for a pixel to be encoded in accordance with a form of embodiment of the method.

The calculation of the predictor with linear extrapolation is shown in FIG. 2. The course of the trajectory which is suitably parameterized is shown along the abscissa. The values P1 and P2 identify the positions of the already encoded pixels in this case along the trajectory used for prediction and point P3 is the position of the pixel which is to be predicted. The corresponding pixel values of the pixels are plotted along the ordinate, as corresponding brightness values for example. The pixel value of the pixel at position P1 is labeled $w_i$ in this case and the pixel value of the pixel at position P2 is labeled $w_2$. For linear extrapolation a straight line is now drawn through the pixels $w_1$ and $w_2$, and in accordance with the linear equation, the pixel value of the pixel to be encoded is determined at position P3 $\hat{w}$. It can be seen that in the scenario of FIG. 1 the pixel value of $w_1$ after $w_2$ reduces by the distance $\Delta w$. The predicted pixel value $\hat{w}$ is also less than the pixel value $w_2$ by this distance.

Instead of the linear extrapolation described above, the prediction value can also be determined in another way, by a spline interpolation or polynomial interpolation for example. The average value of the pixels can also be used as the prediction value is necessary.

In a further variant of the method, the selection of the trajectory can be modified by a reliability factor g(a) which depends on the distance a between the pixel to be predicted and the closest pixel. This modified distance parameter $f_1'$ can typically be expressed as follows:

$$f_1' = g(a) \cdot f_1$$

The above equation enables account to be taken of the fact that trajectories including pixels at a small distance from the predicted pixel are will be selected by preference. The function g(a) is monotonously rising in this case. The reliability factor enables account to be taken of the fact that the probability of a correct prediction is higher, the closer the pixels of a trajectory are to the predicted pixel.

Finally, after the prediction value $\hat{w}$ is determined the residual error is determined and this residual error is subsequently encoded. The predictor $\hat{w}$ does not usually correspond to the original pixel value to be encoded. Therefore an error signal (also referred to as the prediction error) is computed, which corresponds to the difference between predictor and original pixel value. In the event of a lossless encoding this error signal is encoded. It is however also possible for an error limit to be prespecified for encoding, with the originally determined error signal only being encoded if the amount of the difference of the error signal does not lie within the error limit. Should the amount of the difference lie within the error limit, a prediction error of zero is transmitted. If necessary the error limit can also be varied, with the error limit being set to zero in the event of lossless encoding.

Taking account of the error limit achieves a higher compression of the encoded images. Although the image quality falls, it can still be sufficient for specific applications. To take account of an error limit it is useful for the original pixel value of a predicted pixel to be replaced by the pixel value of the predicted pixel if the difference lies within the error limit. In this way it is ensured that encoder and decoder operate on the same data basis, which avoids drift.

After the error signal or prediction error is determined, this error is encoded. This encoding can be undertaken in any way with methods known from the related art. In particular a transformation (e.g., a DCT transformation) of the prediction error can be carried out and subsequently, based on the transformed prediction errors, a quantization and/or an entropy encoding can take place. The quantization and entropy encoding have long been known from the field of video encoding. In such cases quantization leads to a loss, while lossless encoding is carried out by entropy encoding.

If the images of the image sequence are to be encoded in a lossless manner, only entropy encoding and not quantization is used for the encoding of the prediction error. If the prediction error is modified by the encoding (i.e. especially by a quantization) it is useful to replace the original pixel value of the encoded pixel by the pixel value produced from the predicted value and the prediction error encoded and subsequently decoded. In this way it is once again ensured that encoder and decoder have the same data basis for determination of the predictors, so that drift is avoided.

After the encoding of the prediction error just described, the encoded error is transmitted to a decoder. In the decoder a decoding based on the previously described determination of trajectories is implemented in a similar manner. In particular the decoder decodes prediction errors and carries out a prediction based on trajectories of the individual pixel values. Subsequently the predicted pixels are corrected with the decoded prediction errors in order to obtain the original pixel value by this method. In the case of lossless encoding the original pixel value is then also obtained exactly.

During decoding it is not necessary for side information for selecting the trajectory to be transmitted to the decoder since the decoder can undertake the selection of the trajectories in a similar way to the encoder. Only for the case in which the encoder, on grounds of efficiency, decides on another trajectory or if the changes are made between different prediction modes (e.g. between the known modes in the standard H.264/AVC for encoding the prediction error) can corresponding side information optionally be transmitted.

In the initialization of the method, the encoding of the first two images is necessarily not undertaken on three-dimensional trajectories from different images since at the beginning there are not yet any encoded pixels from various images available to form the trajectories. Instead a two-dimensional direction prediction of a pixel based on pixels of the same image is used. Furthermore for the first pixels to be encoded of the first or the second image a completely different encoding is used (e.g. an intra-encoding without prediction) since at the beginning no two-dimensional trajectories in the same image can yet be formed. A direction prediction based on three dimensions, i.e. taking into account the z direction, only occurs during the encoding of the third image after the initialization of the method.

Before the third image to be encoded three-dimensional and also two-dimensional trajectories of length n=2 are provided, as is indicated in FIG. 1. As an alternative, two-dimensional trajectories within the same image can also be used exclusively in the third image. It is then however necessary, for selected image areas (e.g. blocks of prespecified size), to signal the prediction mode and transmit it as side information to the decoder. The three-dimensional prediction can now also be continued for the further images to be encoded, with the maximum length of the three-dimensional trajectories able to be increased by one with each additional image if necessary.

The method described herein has a series of advantages. By selecting a preferred prediction direction per pixel based on corresponding trajectories a good prediction can be achieved, especially for structures in which the same brightness value of an object continues in one direction, as is especially the case with medical image data. This enables a higher encoding efficiency, especially for lossless, or almost lossless, encoding to be achieved. The prediction direction is determined on the basis of pixels already encoded. This determination is carried out in the decoder in the same way as in the encoder so that no additional prediction information needs to be transmitted from the encoder to the decoder. This also increases the coding efficiency.

Figure 3:
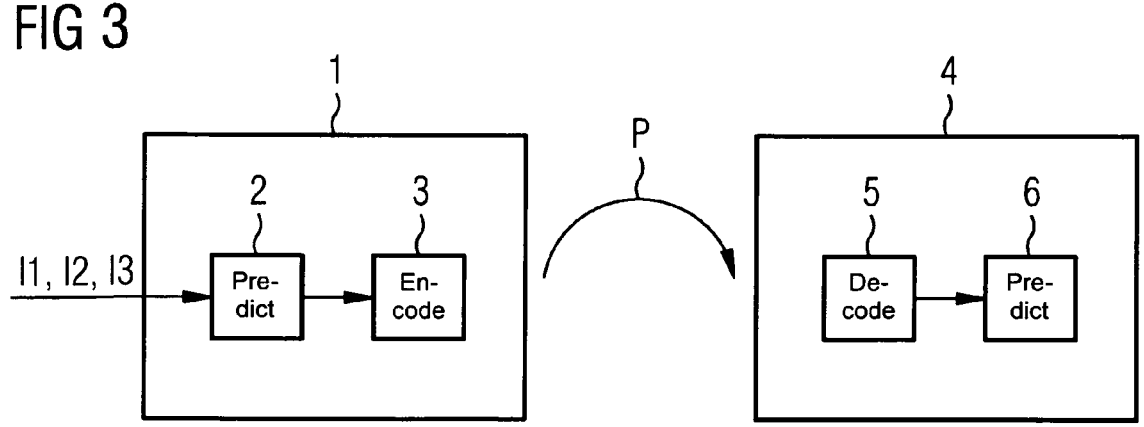
FIG. 3 a schematic diagram of a system including encoder and decoder for encoding and decoding a digitized sequence of images in accordance with the form of embodiment of the method.

FIG. 3 shows a schematic diagram of the system for encoding and decoding a sequence of images based on a form of embodiment of the method. The encoder for encoding the sequence of images in this case is labeled with the reference number 1 and the image data stream fed to the encoder with the images I1, I2 and I3 is initially fed to a prediction unit 2, which on the basis of the method uses trajectories to determine a prediction value and the corresponding prediction error between prediction value and original pixel value of the individual pixels. The prediction errors are then fed to an encoding unit 3 which, based on a corresponding known encoding method, such as quantization or entropy encoding, encodes the prediction error.

The encoded prediction error is finally transmitted via a transmission path, which is indicated by the arrow P, to a decoder 4. The transmission path can be wired or wireless in such cases. In the decoder the received prediction error is decoded in a corresponding decoding unit 5. Furthermore the prediction of the pixel values is carried out in a prediction unit 6, with the prediction executing in a similar way to the prediction means 2 based on trajectories. The predicted pixels are then corrected with the decoded prediction error so that with lossless encoding the original pixel value and with lossy encoding an approximated pixel value is obtained.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for encoding a sequence of digitized images formed of pixels with associated pixel values, in which the pixels to be encoded in the images are predicted and prediction errors produced by prediction are encoded, with the prediction of a pixel to be encoded being undertaken for at least some of the pixels to be encoded, said method comprising:
    determining trajectories, each running through the pixel to be encoded, running through other already encoded pixels from the image of the pixel to be encoded and from one or more images temporally proximate to the image of the pixel to be encoded;
    defining, for each trajectory, a valuation parameter having a value in inverse relationship to deviations in the associated pixel values of the other pixels along the trajectory; and
    determining a predicted pixel value of the pixel to be encoded, based on the associated pixel values of the other pixels of each trajectory with a highest valuation.

2. The method as claimed in claim 1, wherein the valuation parameter depends on a sum of an amount of numerical deviations or quadratic deviations between the associated pixel values of the other pixels of the trajectory and an average value of the associated pixel values, with the valuation parameter increasing as the numerical deviations or quadratic deviations decrease.

3. The method as claimed in claim 2, wherein the valuation parameter depends on distances between the other pixels of the trajectory, with the valuation parameter being higher for larger distances.

4. The method as claimed in claim 3, wherein the evaluation parameter depends on a distance between the pixel to be encoded and another pixel of the trajectory lying closest to the pixel to be encoded, with the valuation parameter being higher for shorter distances.

5. The method according to claim 4, wherein trajectories having identical length and/or different lengths are taken into account in the prediction.

6. The method as claimed in claim 5, wherein a permitted length of the trajectories used in the prediction is increased by one pixel after each encoding of an image and/or is selected as a fixed length for a prespecified number of consecutive images.

7. The method as claimed in claim 6, wherein the predicted pixel value for the pixel to be encoded is determined by extrapolation.

8. The method as claimed in claim 7, wherein the extrapolation includes at least one of linear extrapolation, spline extrapolation and polynomial extrapolation.

9. The method as claimed in claim 8, wherein the average value of the associated pixel values of the other pixels is the predicted pixel value of the pixel to be encoded.

10. The method as claimed in claim 9, wherein, for at least some of the images, the other pixels are from an image containing the pixel to be encoded and/or from different images.

11. The method as claimed in claim 10, wherein at least two initial images are encoded using the other pixels from the image containing the pixel to be encoded and/or based on an alternate encoding method.

12. The method as claimed in claim 11, further comprising encoding the prediction errors produced by the prediction by representing at least partly by a deviation between the associated pixel value and the predicted pixel value of the pixel to be encoded.

13. The method as claimed in claim 12, further comprising:
    prespecifying a threshold value;
    setting the prediction error produced from the prediction to zero if the threshold value is not exceeded, and
    replacing the associated pixel value, of a pixel having a prediction error of zero, by the predicted pixel value.

14. The method as claimed in claim 13, wherein the prediction errors are encoded in a lossless and/or lossy manner.

15. The method as claimed in claim 14, wherein the encoding of each of the prediction errors includes at least one of transformation, quantization and entropy encoding.

16. The method as claimed in claim 15,
    wherein the encoding of the prediction errors is lossy and the associated pixel value of the pixel to be encoded is replaced by the predicted pixel value, and
    wherein upon decoding a decoded pixel value is corrected using a decoded prediction error.

17. The method as claimed in claim 16, further comprising creating side information for signaling a prediction mode used for encoding of the digitized images.

18. The method as claimed in claim 17, wherein the digitized images are medical X-ray images.

19. A method for decoding a sequence of images formed of pixels with associated pixel values, in which the pixels encoded in the images are predicted and prediction errors produced by prediction were encoded, with the prediction of a pixel encoded for at least some of the pixels that were encoded, said method comprising:
    determining trajectories, each running through the pixel to be decoded and other previously decoded pixels from the image of the pixel to be decoded and from at least one previously decoded image temporally proximate to the image of the pixel to be decoded;
    defining, for each of the trajectories determined, a valuation parameter having a value in inverse relationship to deviations in decoded pixel values of the other pixels along the trajectory; and
    determining a predicted pixel value of the pixel to be decoded, based on the other pixels of the trajectory with a highest valuation.

20. A method for transmitting a sequence of digitized images formed of pixels with associated pixel values, comprising:
    encoding the digitized images, in which the pixels to be encoded in the images are predicted and prediction errors produced by prediction are encoded, with the prediction of a pixel to be encoded being undertaken for at least some of the pixels to be encoded, by
    determining trajectories, each running through the pixel to be encoded, running through other already encoded pixels from the image of the pixel to be encoded and from one or more images temporally proximate to the image of the pixel to be encoded;
    defining, for each trajectory, an encoding valuation parameter having a value in inverse relationship to deviations in the associated pixel values of the other pixels along the trajectory; and
    determining an encoding predicted pixel value of the pixel to be encoded, based on the other pixels of each trajectory with a highest valuation,
    transmitting encoded images produced by said encoding over a transmission link; and
    decoding the encoded images by
    determining trajectories, each running through the pixel to be decoded and other previously decoded pixels from the image of the pixel to be decoded and from at least one previously decoded image temporally proximate to the image of the pixel to be decoded;

defining, for each of the trajectories determined, a decoding valuation parameter having a value in inverse relationship to deviations in decoded pixel values of the other pixels along the trajectory; and determining a decoding predicted pixel value of the pixel to be decoded, based on the other pixels of the trajectory with a highest valuation.

21. An encoder encoding a sequence of digitized images formed of pixels with associated pixel values, in which the pixels to be encoded in the images are predicted and prediction errors produced by prediction are encoded, with the prediction of a pixel to be encoded being undertaken for at least some of the pixels to be encoded, comprising:

a processor programmed to perform operations of determining trajectories, each running through the pixel to be encoded, running through other already encoded pixels from the image of the pixel to be encoded and from one or more images temporally proximate to the image of the pixel to be encoded;

defining, for each trajectory, a valuation parameter having a value in inverse relationship to deviations in the associated pixel values of the other pixels along the trajectory; and determining a predicted pixel value of the pixel to be encoded, based on the other pixels of each trajectory with a highest valuation; and encoding the prediction errors resulting from the prediction.

22. A decoder decoding a sequence of encoded images formed of pixels with associated pixel values, in which the pixels encoded in the images are predicted and prediction errors produced by prediction were encoded, with the prediction of a pixel encoded for at least some of the pixels that were encoded, comprising:

a processor programmed to perform operations of determining trajectories, each running through the pixel to be decoded and other previously decoded pixels from the image of the pixel to be decoded and from at least one previously decoded image temporally proximate to the image of the pixel to be decoded;

defining, for each of the trajectories determined, a valuation parameter having a value in inverse relationship to deviations in decoded pixel values of the other pixels along the trajectory; and determining a predicted pixel value of the pixel to be decoded, based on the other pixels of the trajectory with a highest valuation.

23. A system, comprising:

an encoder encoding a sequence of digitized images formed of pixels with associated pixel values, in which the pixels to be encoded in the images are predicted and prediction errors produced by prediction are encoded, with the prediction of a pixel to be encoded being undertaken for at least some of the pixels to be encoded, comprising:

a first processor programmed to perform operations of determining trajectories, each running through the pixel to be encoded, running through other already encoded pixels from the image of the pixel to be encoded and from one or more images temporally proximate to the image of the pixel to be encoded;

defining, for each trajectory, an encoding valuation parameter having a value in inverse relationship to deviations in the associated pixel values of the other pixels along the trajectory; and determining an encoding predicted pixel value of the pixel to be encoded, based on the other pixels of each trajectory with a highest valuation; and encoding the prediction errors resulting from the prediction; and a decoder decoding the sequence of encoded images formed of pixels with associated pixel values, in which the pixels encoded in the images are predicted and prediction errors produced by prediction were encoded, with the prediction of a pixel encoded for at least some of the pixels that were encoded, comprising:

a second processor programmed to perform operations of determining trajectories, each running through the pixel to be decoded and other previously decoded pixels from the image of the pixel to be decoded and from at least one previously decoded image temporally proximate to the image of the pixel to be decoded;

defining, for each of the trajectories determined, a decoding valuation parameter having a value in inverse relationship to deviations in decoded pixel values of the other pixels along the trajectory; and determining a decoding predicted pixel value of the pixel to be decoded, based on the other pixels of the trajectory with a highest valuation.

* * * * *